United States Patent
Mozer (10) Patent No.: US 11,987,173 B2
(45) Date of Patent: May 21, 2024

(54) STEERING COLUMN SWITCH FOR A VEHICLE

(71) Applicant: Valeo Schalter und Sensoren GmbH, Bietigheim-Bissingen (DE)

(72) Inventor: Reiner Mozer, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 281 days.

(21) Appl. No.: 17/441,465

(22) PCT Filed: Mar. 11, 2020

(86) PCT No.: PCT/EP2020/056446
§ 371 (c)(1),
(2) Date: Sep. 21, 2021

(87) PCT Pub. No.: WO2020/193132
PCT Pub. Date: Oct. 1, 2020

(65) Prior Publication Data
US 2022/0161715 A1  May 26, 2022

(30) Foreign Application Priority Data

Mar. 22, 2019 (DE) ............ 10 2019 107 342.1

(51) Int. Cl.
*B60Q 1/14* (2006.01)
*B60Q 1/42* (2006.01)

(52) U.S. Cl.
CPC .......... *B60Q 1/1476* (2013.01); *B60Q 1/425* (2013.01)

(58) Field of Classification Search
CPC ........ B60Q 1/1476; B60Q 1/425; G05G 1/02; G05G 13/00; G05G 1/015; G05G 1/08;
(Continued)

(56) References Cited

U.S. PATENT DOCUMENTS 5,404,101 A    4/1995  Logue
6,873,233 B2 * 3/2005  Sugiyama ............ H03K 17/97
                                                                335/206
(Continued)

FOREIGN PATENT DOCUMENTS

CN    101655345 A    2/2010
CN    102498366 A    6/2012
(Continued)

OTHER PUBLICATIONS

International Search Report and Written Opinion in corresponding International Application No. PCT/EP2020/056446, dated Jun. 9, 2020 (12 pages).

(Continued)

*Primary Examiner* — Edwin A. Leon
(74) *Attorney, Agent, or Firm* — Osha Bergman Watanabe & Burton LLP (57) ABSTRACT

Steering column switch (20) for a vehicle, in particular for a utility vehicle, wherein the steering column switch (20) has a housing (32), an actuating device which can be coupled to an operating element and has at least one actuating element (21, 22, 23), a magnet (24) and a magnetic sensor (28), wherein an actuating movement of an actuating element (21, 22, 23) in a first actuating direction (R1, R2, R3) can bring about a relative movement between the magnet (24) and the magnetic sensor (28) in a first direction of movement and an actuating movement of an actuating element (21, 22, 23) of the actuating device in a second actuating direction (R1, R2, R3) can bring about a relative movement between the magnet (24) and the magnetic sensor (28) in a second direction of movement different from the first direction of movement, wherein the magnetic sensor (28) is set up to detect the relative movement between the magnet (24) and the magnetic sensor (28) in each case in the first direction of movement (R1, R2, R3) and in the second direction of (Continued)

movement (R1, R2, R3) and, depending on the detected relative movement in the first direction of movement, to generate a first switching signal and, depending on the detected relative movement in the second direction of movement, a second switching signal.

13 Claims, 3 Drawing Sheets

(58) Field of Classification Search
CPC .......... G05G 1/04; H01H 36/00; H01H 36/01; H01H 36/02
USPC ...................................................... 200/61.54
See application file for complete search history.

(56) References Cited

U.S. PATENT DOCUMENTS

| | | | |
|---|---|---|---|
| 7,485,819 B2* | 2/2009 | Reischl | B60Q 1/1476 200/61.54 |
| 2018/0264996 A1 | 9/2018 | Gudimalla et al. | |

FOREIGN PATENT DOCUMENTS

| | | |
|---|---|---|
| DE | 19749330 A1 | 5/1999 |
| DE | 69923511 T2 | 2/2006 |
| DE | 102016205766 A1 | 10/2017 |
| DE | 112016005544 T5 | 8/2018 |
| EP | 3108210 A1 | 12/2016 |
| EP | 3441262 A1 | 2/2019 |
| JP | 2009016262 A | 1/2009 |
| JP | 2017016920 A | 1/2017 |
| WO | 2005052505 A2 | 6/2005 |
| WO | 2008067954 A1 | 6/2008 |
| WO | 2016082830 A1 | 6/2016 |

OTHER PUBLICATIONS

German Search Report issued in corresponding German Application No. 10 2019 107 342.1, dated Dec. 16, 2019 (8 pages).

Second Office Action in corresponding Chinese Application No. 202080037047.9, dated Feb. 8, 2024 (15 pages).

* cited by examiner

Fig. 1

Prior art

STEERING COLUMN SWITCH FOR A VEHICLE

The present invention relates to a steering column switch for a vehicle, in particular for a utility vehicle, wherein the steering column switch has a housing, an actuating device which can be coupled to an operating element and has at least one actuating element, a magnet for generating a magnetic field, and a magnetic sensor for detecting the magnetic field generated by the magnet. The at least one actuating element is at least partially movably mounted with respect to the housing, it being possible to bring about a relative movement between the magnet and the magnetic sensor by an actuating movement of an actuating element. The magnetic sensor is set up to detect the relative movement between the magnet and the magnetic sensor and/or a relative position of the magnet and magnetic sensor to one another and, depending on the detected relative movement and/or the detected relative position, to generate a switching signal for determining an actuating position of the actuating device and thus a switching state of the steering column switch.

The invention also relates to a steering column lever with a steering column switch and to a vehicle with a steering column lever.

Steering column switches are known in principle from the prior art, with the steering column switch referring to the switches or devices which are arranged on the steering column, that is to say on the fixed part of the steering between the dashboard and steering wheel, and which can as a rule be coupled with lever-like operating elements and/or with rotary operating elements and with the aid of which allow the actuation in a vehicle of direction of travel indicators, vehicle lighting, switching from low beam to high beam, headlight flasher, windscreen wiper and washer control, and moreover control of the automatic cruise control and/or gear selection in some vehicles.

Frequently, an operating element is assigned several different functions, the individual functions usually being able to be triggered by different actuating movements, in particular by actuating movements in different actuating directions, in particular depending on the position of the operating element. To control the individual functions, a common printed circuit board, extending in a printed circuit board plane, with an evaluation device, for example a microcontroller, is usually provided, to which the positions of the operating element can be transmitted.

For detecting the position of the operating element, different concepts are known from the prior art, in particular different steering column switch concepts.

On the one hand, steering column switches are known, for example, in which the positions of the individual operating elements are detected with the aid of mechanically actuatable electrical contacts, a change in the position of an operating element causing at least one associated contact to open or close, so that from the at least one detected contact state the position of the operating element can be determined and the corresponding function can be triggered. As a rule, the electrical contacts are formed from contact (sliding) surfaces and contact slides sliding thereon or contact elements that can be moved relative to one another.

It is also known to contactlessly detect the individual actuating states, in particular the position of the operating element, instead of by means of electrical contacts, with the aid of magnets and magnetic sensors, and to transmit a signal generated by the magnetic sensor via electrical conductors to a common printed circuit board for further evaluation, with each actuating direction being assigned a separate magnet and a corresponding magnetic sensor, which are each arranged in accordance with the respective actuating directions relative to one another and are movable relative to one another.

Against this background, it is an object of the present invention to provide an alternative steering column switch, preferably a more simply constructed and thus more cost-effective steering column switch, in particular a steering column switch which allows a more compact design and thus requires less installation space.

This object is achieved according to the invention by a steering column switch according to the independent patent claim. Advantageous embodiments of the invention are the subject matter of the dependent patent claims, of the description and of the figures.

A steering column switch designed according to the present invention for a vehicle, in particular for a utility vehicle, has a housing, an actuating device which can be coupled to an operating element and has at least one actuating element, a magnet for generating a magnetic field, and a magnetic sensor for detecting the magnetic field generated by the magnet, wherein the at least one actuating element is at least partially movably mounted with respect to the housing and an actuating movement of the actuating element can bring about a relative movement between the magnet and the magnetic sensor, and wherein the magnetic sensor is set up to detect the relative movement between the magnet and the magnetic sensor and/or a relative position of the magnet and magnetic sensor to one another and, depending on the detected relative movement and/or the detected relative position, to generate a switching signal for determining an actuating position of the actuating device and thus a switching state of the steering column switch.

A steering column switch according to the invention is characterized in that an actuating movement of an actuating element of the actuating device in a first actuating direction can bring about a relative movement between the magnet and the magnetic sensor in a first direction of movement and an actuating movement of an actuating element of the actuating device in a second actuating direction can bring about a relative movement between the magnet and the magnetic sensor in a second direction of movement different from the first direction of movement, wherein the magnetic sensor is set up to detect the relative movement between the magnet and the magnetic sensor and/or a relative position of the magnet and magnetic sensor to one another in each case in the first direction of movement and in the second direction of movement and, depending on the detected relative movement and/or the detected relative position in the first direction of movement, to generate a first switching signal and, depending on the detected relative movement and/or the detected relative position in the second direction of movement, a second switching signal.

By using the same magnet, that is to say a common magnet, and using the same magnetic sensor, that is to say a common magnetic sensor, to detect the actuation of the actuating device for two different actuating directions instead of a dedicated, separate magnet and/or magnetic sensor for each of the actuating directions, on the one hand the number of magnets and/or magnetic sensors required can be reduced. On the other hand, considerably less installation space is required for such a sensor system, so that a steering column switch according to the invention can be designed to be particularly compact and thus requires little installation space and is very space-saving. And that in particular with a comparable functionality compared with steering column switches known from the prior art.

A steering column switch according to the invention is preferably designed in such a way that a relative movement between magnet and magnetic sensor brought about as a result of an, in particular mechanical, actuation of the actuating device, in particular as a result of a mechanical actuation of an actuating element, leads to a change in the magnetic flux density of the magnetic field generated by the magnet, wherein the change in the magnetic flux density of the magnetic field generated by the magnet can be detected by means of the magnetic sensor.

By means of an evaluation device which is preferably additionally present, in particular in a further, particularly preferred embodiment of a steering column switch according to the invention, the relative movement between the magnet and the magnetic sensor can then preferably be determined and thus an actuating movement of the actuating device, in particular a switching position and/or a switching state of the steering column switch, in particular with respect to the first actuating direction and/or the second actuating direction.

In a further advantageous embodiment of a steering column switch according to the invention, it is preferably designed and set up in such a way that, in particular when the steering column switch is properly installed in a vehicle, one or more actuator devices coupled to the steering column switch can preferably be controlled as a function of the determined switching state(s).

In the context of the present invention, an "actuating direction" is understood to mean, in particular, a movement path of an associated actuating element, in particular independent of the sign, that is to say a movement in both directions along an associated movement path.

In the context of the present invention, a "direction of movement" is understood to mean, in particular, a resulting movement path, in particular independent of the sign, in particular a resulting movement path of the magnet or the magnetic sensor. If both the magnet and the magnetic sensor are moved, that is to say both, in particular simultaneously, in order to bring about the corresponding relative movement between the magnet and the magnetic sensor, the direction of movement in this case is preferably in each case the resulting movement path, that is to say the resulting movement path arising in each case from the resultant of the individual movement vectors of the magnet and magnetic sensor.

In other words, if only the magnet is moved, the direction of movement of the magnet is defined in particular by the resulting movement path of the magnet along which the magnet is moved relative to the magnetic sensor, and if only the magnetic sensor is moved, the associated direction of movement of the magnetic sensor is defined in particular by the resulting movement path of the magnetic sensor along which the magnetic sensor is moved relative to the magnet.

In a particularly preferred embodiment of a steering column switch according to the invention, it is preferably designed in such a way that the magnet can be moved by at least one actuating movement of at least one of the actuating elements of the actuating device, in particular only the magnet, while the magnetic sensor is preferably not moved. This has proven to be particularly advantageous if the magnetic sensor is arranged on a carrier plate, for example on a printed circuit board, since in this case the entire carrier plate would otherwise have to be concomitantly moved to move the magnetic sensor, while if only the magnet is to be moved, as a rule only smaller components and/or parts have to be concomitantly moved, which in many cases is easier to implement and therefore more advantageous in the generally very limited installation space available.

In some cases, however, it can also be more advantageous to move the magnetic sensor relative to the magnet, in particular together with an associated carrier plate.

In order to bring about the corresponding relative movements between the magnet and magnetic sensor in the first direction of movement and in the second direction of movement in each case depending on an actuating movement of the actuating device in a first actuating direction and a second actuating direction, the actuating device has in particular special, appropriately designed and suitable kinematics, in particular a plurality of, preferably at least two, actuating elements which are coupled to the magnet and the magnetic sensor in a correspondingly suitable manner in such a way that a corresponding relative movement between the magnet and the magnetic sensor can be brought about by actuating the actuating device, in particular in each case at least one actuating element. In addition, the magnet and the magnetic sensor are preferably also designed in a suitable manner, wherein the magnet in particular has a suitable polarity and in particular is arranged and movable in a suitable manner relative to the magnetic sensor.

A steering column switch according to the invention, in particular the actuating device, has in particular at least one actuating element mounted movably with respect to the housing in at least one actuating direction, wherein the actuating element is coupled to the magnet and/or the magnetic sensor in such a way that an actuating movement of the actuating element can bring about a relative movement between the magnet and the magnetic sensor in at least one direction of movement.

As a result, when the steering column switch is properly installed in a vehicle, an actuation of an operating element coupled to the actuating device can be transmitted to the steering column switch, preferably to the actuating device, in particular to an actuating element of the actuating device.

In a preferred embodiment of a steering column switch according to the invention, the actuating device has at least one first actuating element mounted movably in a first actuating direction and at least one second actuating element mounted movably in a second actuating direction, wherein the first actuating element and the second actuating element are coupled in particular in each case to the magnet and/or the magnetic sensor in such a way that, by means of the first actuating element, a relative movement between the magnet and the magnetic sensor in a first direction of movement can be brought about and, by means of the second actuating element, a relative movement between the magnet and the magnetic sensor in a second direction of movement different from the first direction of movement can be brought about. In this way, a steering column switch that can be actuated in at least two actuating directions can be provided in a simple manner.

In a further preferred embodiment of a steering column switch according to the invention, in particular in a further development, the steering column switch is preferably also designed in such a way that a mechanical actuating movement of the actuating device in a third actuating direction, in particular an actuating movement of an actuating element of the actuating device in a third actuating direction, can bring about a relative movement between the magnet and the magnetic sensor in a third direction of movement, wherein the magnetic sensor is preferably set up to detect the relative movement and/or a relative position of the magnet to the magnetic sensor in each case in the first direction of movement, in the second direction of movement and in the third direction of movement and, depending on the detected relative movement and/or the detected relative position in the first direction of movement, to generate a first switching signal and, depending on the detected relative movement and/or the detected relative position in the second direction of movement, to generate a second switching signal, and, depending on the detected relative movement and/or the detected relative position in the third direction of movement, to generate a third switching signal, in which case the magnetic sensor has in particular a 3D Hall sensor or is a 3D Hall sensor.

In a further preferred embodiment of a steering column switch according to the invention, in particular in a further development, the actuating device has a further, in particular third, actuating element mounted movably in a further, in particular third, actuating direction, wherein preferably, by means of the first actuating element coupled to the magnet and/or the magnetic sensor, a relative movement between the magnet and the magnetic sensor in a first direction of movement can be brought about, and preferably, by means of the first actuating element and/or by means of a second actuating element coupled to the magnet and/or the magnetic sensor, a relative movement between the magnet and the magnetic sensor in a second direction of movement different from the first direction of movement can be brought about, and wherein preferably, by means of the first actuating element and/or by means of the second actuating element and/or by means of the further actuating element coupled to the magnet and/or the magnetic sensor, a relative movement between the magnet and the magnetic sensor can be brought about in a third direction of movement that is different from both the first direction of movement and the second direction of movement.

In a further embodiment of a steering column switch according to the invention, in particular as an alternative or in addition to a third actuating element, the actuating device can also have an actuating element mounted movably in at least two different directions of movement, this actuating element being coupled in particular to the magnet and/or the magnetic sensor in such a way that an actuating movement of the actuating element can bring about a relative movement between the magnet and the magnetic sensor at least in a first direction of movement or alternatively, in particular optionally, in a further, in particular second or third direction of movement different from the first direction of movement.

As a result, a relative movement between the magnet and the magnetic sensor in a further direction of movement different from the first direction of movement, in particular a second or third direction of movement, can also be brought about, in particular optionally, by an actuating movement of the first actuating element. In other words, an actuating element of the steering column switch can preferably be used to effect an actuating movement in two different directions of movement, in particular optionally, that is to say not simultaneously, but alternatively. Thus, three relative directions of movement can be realized with only two actuating elements.

In a further preferred embodiment of a steering column switch according to the invention, at least one of the directions of movement in which the magnet and the magnetic sensor can be moved relative to one another, that is to say at least the first direction of movement and/or the second direction of movement, in particular the first direction of movement, is a direction of rotation, wherein the steering column switch, in particular the actuating device, is preferably designed in such a way that a relative rotation between the magnet and the magnetic sensor about a first axis can be brought about by means of an actuating element, in particular a rotation of the magnet relative to the magnetic sensor.

This makes it possible to provide a steering column switch which allows a rotary actuation and thus in particular the use of a rotary ring or rotary switch as an operating element, in particular in a steering column lever, which is an advantage in many cases from an ergonomic point of view.

The steering column switch is preferably designed in such a way that the rotational movement between the magnet and the magnetic sensor, i.e. the rotation of the magnet and the magnetic sensor relative to one another, can preferably be brought about by a rotation of the associated actuating element, wherein the actuating element can also particularly preferably be rotated in particular about the first axis.

For this purpose, in a particularly preferred embodiment of the steering column switch, the magnet or the magnetic sensor, preferably the magnet, is in particular coupled in a rotationally fixed manner to the associated actuating element, in particular connected, preferably by a form-fitting connection, for example by means of a projection which is fixedly connected to the magnet, extends in the radial direction to the first axis and at least partially in the axial direction along the first axis and engages in a corresponding recess in the actuating element, or vice versa.

A tongue-and-groove connection in which a radial projection engages in a groove, in particular a rail-shaped groove, has proven to be particularly advantageous for this type of connection. This makes it possible in a simple manner in particular to drive along the magnet with the actuating element when the actuating element is actuated, in particular when the actuating element is rotated. The magnet itself can have or form a corresponding groove or a corresponding projection, that is to say it can be formed integrally with the projection. The projection can, however, also be formed by a further component connected to the magnet, in particular a driver.

In a particularly preferred embodiment of a steering column switch according to the invention, the latter, in particular the actuating device, is designed in such a way that an axial distance in the longitudinal direction of the axis of rotation between the magnet and the magnetic sensor remains constant during a rotational movement of the magnet about the first axis, i.e. is unchangeable, and the magnet and the magnetic sensor are merely rotated relative to one another, wherein the magnet particularly preferably has a defined polarity which is selected such that a rotation between the magnet and the magnetic sensor causes a change in the magnetic field, in particular the magnetic flux density.

Particularly preferably, the first switching signal assumes at least a first switching value when the magnet has been rotated into a first rotational position relative to the magnetic sensor about the first axis or is in the first rotational position, and a second switching value when the magnet has been rotated into a second rotational position relative to the magnetic sensor about the first axis or is in this second rotational position. This enables a rotary switch to be realized in a particularly simple manner. In this case, the actuating element is preferably a rotary ring or a rotary switch, wherein the rotatable actuating element can in particular be coupled to a rotary operating element, in particular a rotary operating ring or a rotary operating knob.

In a particularly preferred embodiment of a steering column switch according to the invention, the magnet and the magnetic sensor can be rotated relative to one another by means of the rotatable actuating element, preferably by a total angle of rotation of at least 10°, 20°, 30°, 40° or 50° up to in each case a maximum of 60°, 70°, 80°, 90° or 100°, with it being particularly preferred that the magnet can be rotated with respect to the magnetic sensor.

Particularly preferably, the magnet and the magnetic sensor can be rotated relative to one another in a plurality of, preferably equidistant, steps over the entire angle of rotation range, in particular in at least two, particularly preferably in at least eight, preferably in at least ten, discrete steps.

As a result, with the aid of a correspondingly suitable rotary operating element, different switching stages can be realized in a particularly simple manner, above all in a particularly space-saving manner, wherein particularly preferably in each case a corresponding switching signal, in particular a respective correspondingly unique signal, can be generated for each of the discrete switching stages so that a corresponding evaluation of the switching state of the steering column switch is possible.

In this way, for example, with just a single rotary operating element that is coupled to the associated actuating element of the steering column switch when a steering column switch is properly installed in a vehicle, various switching states of a lighting device coupled to the steering column switch can be switched, for example parking light, low beam, daytime running light and automatic light.

In this case, an associated switching signal can preferably assume more than a first switching value and a second switching value, preferably at least eight, in particular up to ten, switching values over the entire actuation range, in particular discrete switching values, so that more than two actuating states can be detected in the associated actuating direction.

In a further preferred embodiment of a steering column switch according to the invention, at least one of the directions of movement in which the magnet and the magnetic sensor can be moved relative to one another is an axial direction, preferably at least the first direction of movement and/or the second direction of movement, in particular the second direction of movement, wherein preferably, by means of at least of an actuating element, an axial displacement between the magnet and the magnetic sensor along a second axis can be brought about, in particular an axial displacement of the magnet relative to the magnetic sensor.

This allows an actuation of the steering column switch to be realized by a push button in a particularly simple manner, for example to actuate a horn or a switch to switch a display of an on-board computer or the like.

The second axis particularly preferably runs parallel to the first axis. This allows a particularly advantageous embodiment of the actuating device and thus of the steering column switch.

In a further development of a steering column switch according to the invention, the actuating element which is axially displaceable along the second axis can particularly preferably effect an axial displacement of the magnet or the magnetic sensor, in particular of the magnet, the magnet being displaceable in particular along the first axis in the direction of the magnetic sensor.

That is to say in other words that in a preferred embodiment of a steering column switch according to the invention, in particular in a further development, the magnet and the magnetic sensor can be moved toward one another particularly preferably along the first axis by means of the actuating element which is axially displaceable along the second axis, with preferably the magnet being able to be axially displaced. As a result, a distance along the first axis between the magnet and the magnetic sensor can be reduced, as a result of which the magnetic field strength detected by the magnetic sensor, in particular the magnetic flux density, changes depending on the change in distance between the magnet and the magnetic sensor, with the result that the actuation of the steering column switch can be inferred therefrom.

In a preferred embodiment of a steering column switch according to the invention, the actuating device has at least one second actuating element for this purpose, the second actuating element being axially displaceable in particular along the second axis.

That is to say that preferably a rotation of the magnet and magnetic sensor relative to one another about a first axis, in particular a rotation of the magnet relative to the magnetic sensor, can be brought about by means of a first actuating element and a relative movement in the axial direction along a second axis, in particular an axial displacement of the magnet, can be brought about by means of a second actuating element.

In a particularly preferred embodiment of a steering column switch according to the invention, the steering column switch is designed in particular to be used, in particular installed, in a steering column lever with a plurality of operating elements.

Preferably, at least one operating element of the steering column lever can be actuated in a longitudinal direction of the steering column lever and the axially displaceable actuating element of the steering column switch can be mechanically coupled, in particular connected, to the operating element of the steering column lever, so that by pressing the operating element, in particular in the longitudinal direction of the steering column lever, the steering column switch can be actuated, wherein the axis along which the associated actuating element is axially displaceable in particular runs parallel to the longitudinal direction of the steering column lever and/or parallel to the actuating direction of the operating element, and in particular coincides with at least one of these.

In this way, a pressure operating element can be realized in a particularly simple manner, for example to actuate a horn or to switch a display of an on-board computer or the like.

In a particularly preferred embodiment of a steering column switch according to the invention, the axially displaceable actuating element has a slide extending in the axial direction and an actuating surface extending essentially at right angles to the slide, via which an actuating force can be applied to the slide and the axial displacement of the actuating element can be brought about.

In a particularly simple and preferred embodiment, particularly preferably either the magnet or the magnetic sensor, in particular the magnetic sensor, is axially coupled to the actuating element, in particular axially fixed to the actuating element, wherein the magnet or the magnetic sensor, particularly preferably the magnet, can be connected, preferably by means of a form-fitting connection, to the actuating element directly, that is to say without a further component in between, or indirectly, that is to say with one or more components in between. For this purpose, the magnet can, for example, be inserted into a corresponding recess in the actuating element that limits movement of the magnet in the axial direction.

If the steering column switch is actuated via the associated actuating element, the associated switching signal, preferably the second switching signal, in particular assumes a first switching value when a first relative position between magnet and magnetic sensor has been reached, in particular along the first axis, particularly preferably when the magnet has been displaced into a first position relative to the magnetic sensor along the first axis, and a second switching value when a second relative position has been reached or occupied, in particular if the magnet has been displaced relative to the magnetic sensor into a second position, in particular along the first axis or is in this second position.

In a particularly preferred embodiment of a steering column switch according to the invention, the steering column switch has at least two actuating elements, wherein the magnet or the magnetic sensor, in particular the magnet, is preferably rotationally fixedly coupled to a first of the at least two actuating elements and is rotatably mounted with respect to another, in particular second, actuating element, wherein the magnet is preferably mounted axially displaceably with respect to the first actuating element, but is fixedly coupled to the other, second actuating element in the axial direction.

The magnet or the magnetic sensor, in particular the magnet, is preferably mounted rotatably about a first axis relative to the second actuating element and in particular axially displaceable along the first axis, preferably relative to the first actuating element, wherein the magnet or the magnetic sensor, in particular the magnet, is preferably rotatably received by the second actuating element.

In this way, a particularly compact and space-saving actuating device can be realized and thus a particularly compact and space-saving steering column switch that consequently requires little installation space can be provided.

In a further preferred embodiment of a steering column switch according to the invention, at least one actuating element, preferably a third actuating element, is axially displaceable, wherein in particular an axial displacement of the magnet or the magnetic sensor, in particular along or parallel to the third axis, can be brought about by an axial displacement of the actuating element along or parallel to a third axis.

That is to say, in a further preferred embodiment, the actuating device also has a third actuating element, in particular an actuating element that is also axially displaceable.

The steering column switch is particularly preferably designed in such a way that the magnetic sensor in particular can be axially displaced by means of this third actuating element, preferably in a third direction of movement, in particular along or parallel to the third axis, with a third switching signal being able to be generated in particular by actuating the third actuating element.

In this way, a further actuating function can be integrated into the steering column switch in a simple manner.

In a particularly preferred embodiment of a steering column switch according to the invention, the third axis runs particularly perpendicular to the first axis and/or perpendicular to the second axis. In this way, various actuating functions can be realized in a confined space by actuations in different actuating directions. A particularly intuitive operation of a corresponding steering column switch and thus of a corresponding steering column lever is possible through the different actuating directions, since the individual actuating functions are each assigned to corresponding, different actuating directions.

In a further possible embodiment of a steering column switch according to the invention, the first actuating element and/or the second actuating element can additionally be axially displaceable along a further axis.

That is to say, in other words, that in an alternative embodiment of a steering column switch according to the invention, three actuating directions can also be realized with only two actuating elements, in that two actuations in different actuating directions can be effected by means of one actuating element. It is also conceivable that, even if there are three actuating elements, at least one of the actuating elements can additionally be axially displaced in a further direction and likewise enables two actuations in different actuating directions.

By means of a third actuating element and/or a first actuating element and/or a second actuating element which can be actuated in two actuating directions, at least one further, in particular third, actuating function can be realized in a simple manner.

Particularly preferably, a third switching signal that can be generated in this way assumes a first switching value when a first relative position between magnet and magnetic sensor is reached or occupied, in particular along the third axis, particularly preferably when the magnet has been displaced into a first rotational position relative to the magnetic sensor along the third axis or is in this first position, and preferably at least one second switching value when a second relative position, in particular along the third axis, has been reached, in particular when the magnetic sensor has been displaced into a second position relative to the magnet along the third axis or is in this second position.

The magnet of a steering column switch according to the invention is preferably designed to generate a magnetic field and has a permanent magnet or comprises a permanent magnet. Alternatively, however, it is also conceivable to use an electromagnet as the magnet, in particular a controllable electromagnet, for example a coil or the like that can be energized, which can be specifically energized if required, in particular such that a desired, defined, resulting magnetic field is established.

The magnetic sensor is designed and set up in particular to detect a magnetic flux density of the magnetic field generated by the magnet, in particular to detect a change in a magnetic flux density. Such magnetic sensors are generally known. The magnetic sensor preferably has at least one Hall sensor and/or a magnetoresistive sensor or is a Hall sensor or magnetoresistive sensor.

In this way, an, in particular mechanical, actuation of the actuating device can be detected in a simple manner.

In a particularly preferred embodiment of a steering column switch according to the invention, the magnetic sensor has a 2D or 3D Hall sensor or is a 2D or 3D Hall sensor. With such a magnetic sensor, steering column switches with a common magnetic sensor can be provided in a particularly simple manner for a plurality of actuating directions and for a plurality of directions of movement of the magnet.

In a further, preferred embodiment of a steering column switch according to the invention, in particular a further development, the magnetic sensor is arranged on a carrier plate, in particular a printed circuit board, the carrier plate preferably extending at least partially in a carrier plate plane and the magnetic sensor in particular being arranged on the carrier plate in such a way that the main extent of the magnetic sensor extends at least substantially parallel, preferably parallel, to the carrier plate plane.

The steering column switch preferably also has an evaluation device for evaluating the switching signals generated by the magnetic sensor to determine the movements and/or positions of the actuating elements in the respective actuating directions or the magnets in the respective directions of movement in order to detect the corresponding switching positions and thus the corresponding switching states of the actuating elements of the actuating device for the various actuating directions of the steering column switch. In a particularly advantageous embodiment of a steering column switch according to the invention, the evaluation device is also arranged on the carrier plate, that is to say preferably on a common carrier plate with the magnetic sensor, in particular on a common printed circuit board. In this way, a particularly compact and space-saving arrangement can be achieved and the switching signals can be transmitted quickly to the evaluation device.

In an alternative embodiment, however, a corresponding evaluation device can also be arranged at a different point, for example on a separate printed circuit board. It is also conceivable that the evaluation device is not part of the steering column switch, but rather is arranged in a functional installation state in a vehicle in an assembly outside of the latter and is only electrically connected to the steering column switch, in particular the magnetic sensor.

For the electrical connection, in particular with a control device or the like and/or an actuator system, the steering column switch preferably also has a contacting device, in particular a plug connector device, via which the steering column switch can be electrically connected, for example, to a wiper motor or a horn.

As already mentioned, the magnetic sensor can in particular be arranged, in particular fastened, on a carrier plate, for example on a printed circuit board, wherein in a particularly advantageous embodiment of a steering column switch according to the invention, in particular a relative movement between the magnet and the magnetic sensor can be brought about, preferably in a third direction of movement, in particular an axial displacement of the magnetic sensor relative to the magnet, wherein the axial displacement of the magnetic sensor relative to the magnet can preferably be brought about by an axial displacement of the carrier plate, in particular by an axial displacement in the carrier plate plane, the carrier plate plane particularly preferably extending in a plane perpendicular to the first axis.

As a result, a particularly simple and compact and thus space- and installation space-saving actuating device can be realized, in particular an actuating device with particularly simple kinematics.

The associated actuating element is furthermore preferably coupled to the carrier plate in such a way that an actuating movement of the actuating element can bring about an axial displacement of the carrier plate and thus of the magnetic sensor connected to the carrier plate relative to the magnet.

In a further, preferred embodiment of a steering column switch according to the invention, the magnet is in particular a permanent magnet, the magnet preferably having, at least in sections, in particular completely, the shape of a straight prism with a longitudinal axis extending perpendicular to a base, in particular a straight prism with a circular base. That is to say the magnet is preferably a cylindrical permanent magnet.

This configuration of a magnet enables a simple rotatable mounting of the magnet in one of the actuating elements and also a simultaneous, axially movable mounting relative to a further actuating element.

In the context of the present invention and in the mathematically usual sense, a "prism" is understood to mean a geometric body which is created by parallel displacement of a flat base along a straight line not lying in this plane, with a "straight prism" being understood to mean a prism whose base has been displaced in space along a straight line that is perpendicular to the base.

In a further preferred embodiment of a steering column switch according to the invention, in particular in a further development, the magnetic sensor is arranged on a carrier plate, in particular a printed circuit board, the carrier plate extending at least partially in a carrier plate plane and the magnet being arranged relative to the magnetic sensor in such a way that its longitudinal axis extends perpendicular to the carrier plate plane, wherein the magnet is arranged in particular such that its longitudinal axis coincides with the first axis and the magnet is preferably arranged and mounted in such a way that it can be rotated about its longitudinal axis.

That is to say that particularly preferably a steering column switch according to the invention has a magnet which is in the form of a straight prism and which, in particular, is arranged with one of its end faces facing the magnetic sensor.

In this way, in each case a change in the magnetic flux density that can be detected by the magnetic sensor can be realized in a particularly simple manner with only one magnet by means of a relative movement between the magnet and the magnetic sensor in at least three different directions of movement.

In a further development of a steering column switch according to the invention, the magnet preferably has a constant polarity, in particular along its longitudinal axis, that is to say over its height, a separating plane between the two magnetic poles preferably being formed by a longitudinal center plane.

In other words, the magnet is preferably a single permanent magnet with only one pole pair, that is to say with only one north pole and one south pole, wherein, in the case of a cylindrical magnet with constant polarity over its height, preferably a cylinder half extending over the entire height forms the north pole and the other cylinder half, which also extends over the entire height, forms the south pole.

Such a polarity enables a particularly advantageous, in particular compact and space-saving, configuration of an actuating device for a steering column switch and thus a particularly compact, space-saving and installation space-saving steering column switch. Furthermore, such a magnet can be easily manufactured.

A particularly advantageous embodiment of a steering column switch according to the invention results when a magnet designed in this way is arranged with its separating plane parallel to the first axis. As a result, with a single magnet and a single magnetic sensor, in particular a single 3D Hall sensor, relative movements between the magnet and the magnetic sensor can be detected in three spatial directions.

In a further preferred embodiment of a steering column switch according to the invention, the steering column switch has at least one resetting device, in particular at least one elastically deformable resetting element, preferably an elastic rubber mat and/or a resetting spring, for resetting at least one actuating element, in particular for resetting at least one axially displaceable actuating element.

This makes it possible to ensure in a simple manner that the actuating elements can each be reset again to their starting position, in particular an associated zero position.

In order to still be able to hold a respective actuating element in the actuating position in an actuated state and to be able to maintain an actuating state over a relatively long period of time without a driver having to hold the associated operating element pressed down, for example, the steering column switch can also have, in a further possible embodiment, at least one latching device for releasably latching and/or locking at least one actuating element in at least one actuating position, in particular in at least one switching position, the latching device being designed in particular to hold the actuating element in the actuating position against a resetting force of a present resetting device in the latched-in state.

The latching device is particularly preferably designed in such a way that the latching and/or locking can be released by a renewed actuation of the actuating element, in particular by "overpressing", so that the actuating element can be moved back again into its starting position with the aid of the resetting device.

In this way, an actuating device and thus a corresponding steering column switch can be provided with which an actuating state and thus a switching state can be maintained over a relatively long period of time without the respective associated actuating element of the actuating device having to be manually held in position by a driver.

In a further preferred embodiment of a steering column switch according to the invention, the steering column switch also has at least one mechanically actuatable press switch, in particular a press switch with a mechanically actuatable electrical switching contact, with a mechanical actuating movement of the press switch in particular making electrical contact possible.

In this way, an additional operating function can be realized in a simple manner. As an alternative to an additional operating function, a switching signal generated in this way, in particular by the electrical contacting, can also be used to check the plausibility of a switching signal generated by the magnetic sensor, the press switch for this purpose preferably being arranged and designed in such a way that electrical contacting is effected when the switching signal to be plausibility-checked is to assume in each case the switching value required for plausibility checking.

With the aid of such a press switch, for example a third operating function can be realized in a simple manner if the magnetic sensor is only a 2D Hall sensor and the actuating device only allows actuation in two actuating directions, or a fourth operating function can be realized in the case of a steering column switch with an actuating device with three actuating directions and a 3D Hall sensor.

Further features of the invention emerge from the claims, the figures and the description of the figures. All of the features and combinations of features mentioned above in the description as well as the features and combinations of features mentioned below in the description of the figures and/or shown alone in the figures can be realized not only in the respectively specified combination, but also in other combinations or else on their own, provided this combination can be technically implemented, in particular if a technically advantageous effect can be achieved with the combination.

The invention will now be explained in more detail using a preferred exemplary embodiment and with reference to the accompanying drawings.

Figure 1:
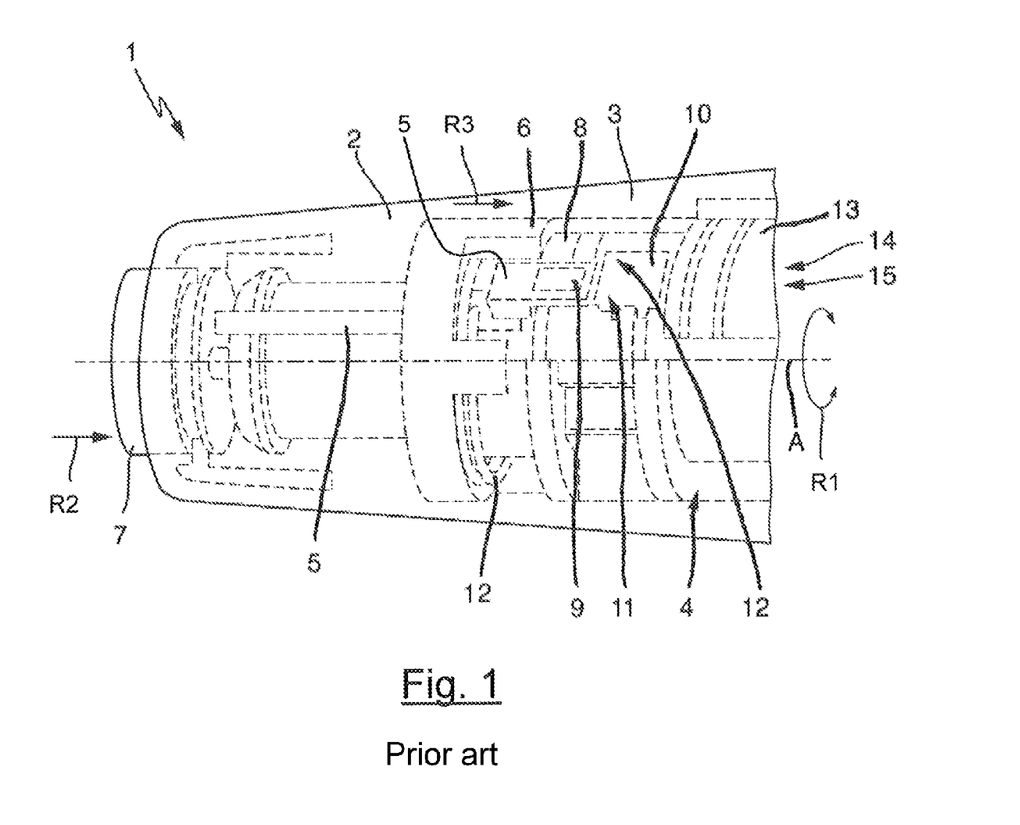
FIG. 1 shows a generic steering column switch from the prior art.

FIG. 1 shows a detail of a steering column lever 1 known from the prior art for a vehicle, in particular for a utility vehicle, with an assembly in the form of a generic steering column switch with a plurality of operating elements 2, 3 and 7 for actuating the steering column lever 1, in particular for actuating various devices of the vehicle, wherein the operating element 7 in this case is designed, for example, to actuate a horn of the vehicle, by means of operating element 2, for example, there can be actuated a wiper device ("washer"), by means of which windshield washer fluid can be applied, and, by means of operating element 3, preferably a lighting device or a windshield wiper device can be actuated.

The operating element 7 is a push button, wherein, by pressing the push button 7 along an axis A, in particular by an actuating movement in an actuating direction R2 along the axis A to the right in relation to the representation in FIG. 1, in a functional installation state in a vehicle, an actuation of the associated device, in this case the horn of the vehicle, can be effected. For this purpose, an actuating movement applied to the operating element 7 in the actuating direction R2 can be transmitted to an associated actuating element 5, mechanically coupled to the push button 7, in the form of a slide 5 which is axially displaceable along the first axis A and to which a permanent magnet 9 is fastened, wherein pressing the push button 7 causes an axial displacement of the slide 5 along the axis A, to the right relative to FIG. 1. As a result, the permanent magnet 9 fastened to the slide 9 is axially displaced relative to a magnetic sensor 11 fastened to a printed circuit board 10, which is fixedly mounted in a housing 4 of the steering column lever 1, in particular with a direction of movement running parallel to the axis A.

As a result, the magnetic field generated by the magnet 9 changes at the associated magnetic sensor 11, in particular a flux density detected by this magnetic sensor 11 and thus a switching signal value of a switching signal generated by the magnetic sensor 11, which can be evaluated by an evaluation device also arranged on the printed circuit board 10 but not designated in detail. The position of the actuating element 5 can be inferred from the switching signal value and it can thus be determined whether the push button 7 has been actuated or not, in particular in which operating or switching state the push button 7 is.

If it has been or is recognized that the push button 7 has been or is being actuated, the associated device, in this case the horn, can be controlled and actuated accordingly by means of the evaluation device.

The operating element 2 can also be actuated by pressing in the axial direction, in particular by pressing in an actuating direction R3, with a corresponding actuating movement applied in the axial direction to actuate this operating element 2 being transmitted to a sleeve-shaped or cage-shaped actuating element 6 on which a second permanent magnet 8 is fastened. Pressing the operating element 2 causes an axial displacement of the cage-like actuating element 6 parallel to or along the axis A, to the right in relation to FIG. 1. In this way, the permanent magnet 8 fastened to the actuating element 6 is displaced axially relative to a second magnetic sensor 12, which is also fastened on a printed circuit board 10.

As has been described above in connection with the push button 7, this generates a switching signal, in particular a second switching signal, which can also be evaluated by the evaluation device. The position of the actuating element 6 can be inferred from this second switching signal value and it can thus be determined whether the operating element 2 has been actuated or not, in particular in which operating or switching state the operating element 2 is.

If it has been or is recognized that the operating element 2 has been or is being actuated, the associated device, in this case the wiper device, can be controlled and actuated accordingly by means of the evaluation device.

The third operating element 3 of the known steering column lever 1, which is illustrated by way of example, is a rotary switch 3, which can be actuated by a rotational movement about the axis A of the steering column lever, in particular an actuating movement in a further actuating direction R1, the rotary switch 3 being rotatable over a defined angle of rotation range with respect to the housing 4, the rotary switch 3 being able to occupy a plurality of switching positions over this angle of rotation range. As a result, different lighting states can be switched with the one rotary switch 3 in the case of a lighting device that can be operated by the rotary switch 3, including, for example, low beam, parking light and daytime running light. If the rotary switch 3 is coupled to a windshield wiper device, different windshield wiper operating modes can be switched, for example.

The operating element 3, that is to say the rotary switch 3, is coupled for this purpose to an actuating element 13 in the form of a rotary ring 13 which is also rotatably mounted about the axis A relative to the housing 4 and on which a third permanent magnet 14, not visible, in the form of a magnetic ring 14 with a plurality of tracks is fastened, the rotary ring 13 with the magnet 14 being movable with respect to a further magnetic sensor 15 also fastened to the printed circuit board 10 and not clearly shown, the printed circuit board 10 extending into the interior of the rotary ring 13. A track is provided for each switching position, which means that the magnetic sensor 15 requires a corresponding Hall sensor or a comparable sensor element for each track. If, as in this case, four tracks are provided, the magnetic sensor 15 accordingly comprises four Hall sensors.

As has previously been described in connection with the other two operating elements 2 and 7, the relative movement between magnet 14 and magnetic sensor 15 also generates switching signal information here, in particular in each case one switching signal per magnetic track, which can also be evaluated by the evaluation device. The position of the rotary ring 13 can be inferred from the switching signal value of the switching signal information and it can thus be determined whether the operating element 3 has been actuated or not, in particular in which operating or switching state the operating element 3 is.

If it has been or is recognized that the operating element 3 has been or is being actuated, and in particular in which switching position it is, the associated device, for example a lighting device or a windshield wiper device, can be controlled and actuated accordingly by means of the evaluation device.

The operating elements 7 and 2 are preferably designed as "touch operating elements", that is to say as operating elements which lead to an actuation of the associated device as long as the respective operating element 7 or 2 is actuated, in particular is kept pressed.

The operating element 3, on the other hand, that is to say the rotary switch 3, is preferably designed as a "latching operating element" which can be latched in at least one, preferably a plurality of, possibly also in all, operating positions, so that an actuation can be maintained even after a release, as it is advantageous, for example, in connection with a lighting or windshield wiper device, so that the driver does not have to actuate the operating element the whole time. Depending on the associated device or individual functions of the device, however, in some cases it can also be advantageous if the operating element is designed to be tactile for one or more actuating positions.

Such a steering column lever, in particular a steering column switch required for this, requires in each case its own separate magnet 8, 9, 14 and in each case its own separate associated magnetic sensor 11, 12, 15 for each actuating direction R1, R2 and R3, in particular for each actuating element 5, 6 and 13, this being associated with a not inconsiderable installation space requirement and with corresponding costs, in particular if the magnetic sensor comprises a plurality of Hall sensors, as in this case the magnetic sensor 15, which has four Hall sensors.

Figures 2, 3:
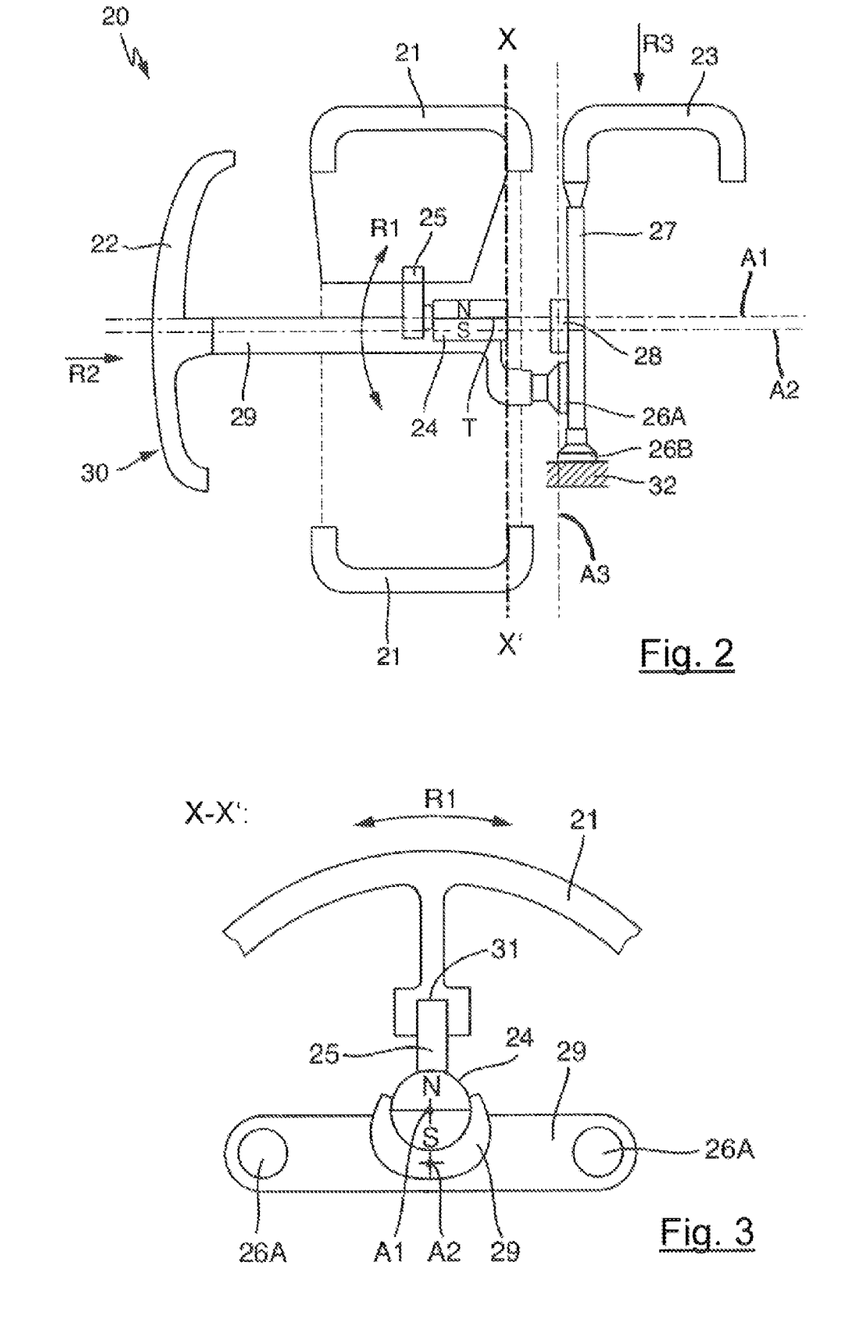
FIG. 2 shows the essential components of an exemplary embodiment of the steering column switch according to the invention in a basic representation from the side.
FIG. 3 shows a section along the section plane A-A' through part of the components from FIG. 1 in a first sectional view.

FIG. 2 shows the essential components of an exemplary embodiment of a steering column switch 20 according to the invention in a basic representation from the side, this exemplary embodiment of a steering column switch 20 according to the invention having a total of three actuating elements 21, 22 and 23, each of which can be coupled to an associated operating element, not shown here, of a steering column lever, and which also, in particular as in the case of the steering column switch known from the prior art described above, can be actuated in three different actuating directions R1, R2 and R3 by a corresponding actuating movement.

The actuating elements 21 and 22 are coupled, in particular connected, to a common magnet in such a way that an actuating movement of one of the actuating elements 21 or 22 in the associated actuating direction R1 or R2 causes the magnet 24 to move relative to a common magnetic sensor 28.

The magnetic sensor 28 is designed to generate both a first switching signal and a second switching signal as a function of the detected magnetic flux density of the magnetic field generated by the magnet 24 or as a function of a change in the magnetic flux density as a result of the relative movement between the magnet 24 and the magnetic sensor 28.

In this exemplary embodiment of a steering column switch according to the invention, the magnetic sensor 28 is a 3D Hall sensor 28, which is arranged on a printed circuit board 27 at a defined distance from the magnet 24, the printed circuit board with its printed circuit board plane extending perpendicular to the first axis A1 and to the second axis A2.

The first actuating element 21 is a rotary ring 21, similar to the rotary ring 13 from FIG. 1, which is rotatably mounted about a first axis A1 in relation to a housing 32 of the steering column switch 20 in FIG. 1 and can be actuated by an actuating movement, in particular by a rotational movement, in a first actuating direction R1.

The second actuating element 22 is mounted axially displaceably relative to the housing 32 along a second axis A2 running parallel to the first axis A1 by an actuating movement in a second actuating direction R2, in particular by being pressed to the right in relation to the illustration in FIG. 1, and has an actuating surface 30 and an axial slide 29. The second actuating element 22 is designed similarly to the actuating element 5 from FIG. 1 for connection to a push button, in particular for realizing a press switch.

The third actuating element 23 is mounted axially displaceably with respect to the housing 32 along a third axis A3 running perpendicular to the first axis A1 and to the second axis A2 by an actuating movement in a third actuating direction R3, in particular by being pressed downward in relation to the illustration in FIG. 1.

The first actuating element 21 is rotationally fixedly connected via a driver 25 to a permanent magnet 24, which is rotatably mounted about the first axis A1 in a recess of the second actuating element 22, in particular in the axial slide 29 of the second actuating element 22, in particular through an angular range of about 90°.

The magnet is polarized equally with respect to its longitudinal axis, as can be seen from FIG. 3, wherein the magnet 24 has a constant polarity over its entire length and has the shape of a prism with a circular base, that is to say is of cylindrical form, wherein the first axis A1 runs in a separating plane T, which is formed by a longitudinal center plane of the magnet 24, between the poles N and S of the magnet 24.

By rotating the first actuating element 21 about the first axis A1 in the first actuating direction R1, a rotational movement of the magnet 24 about the first axis A1 can thus be brought about, in particular relative to the magnetic sensor 28.

This changes a magnetic field generated by the magnet 24 and detected by the magnetic sensor 28, in particular a flux density detected by the magnetic sensor 28, and thus a switching value of a switching signal generated by the magnetic sensor 28, in particular a switching value of the switching signal representative for a relative movement between the magnet 24 and the magnetic sensor 28 in a first direction of movement or for a first actuating direction R1 of the magnet 24, wherein the magnetic sensor 28 is designed to generate a switching signal depending on a rotation angle of the magnet 24 relative to the magnetic sensor 28 about the first axis A1.

As in the case of the steering column switch known from the prior art, the switching signal can be transmitted to an evaluation device also arranged on the printed circuit board 27 and evaluated accordingly by the evaluation device. The position of the actuating element 21 can thus be determined and, in a functional installation state in a vehicle, a corresponding device connected to the evaluation device can be controlled with the aid of a control signal sent by the evaluation device as a function of the actuating position of the actuating element 21.

The magnet 24 is also fixedly connected in the axial direction to the second actuating element 22, in particular to the slide 29 of the second actuating element 22, so that by an axial displacement of the second actuating element 22 along the second axis A2, which runs parallel to the first axis A1, in the second actuating direction R2, in particular by displacing it to the right (with respect to the illustration in FIG. 1), the magnet 24 can also be displaced relative to the magnetic sensor 27, in particular in the direction of the magnetic sensor 28.

This also changes the magnetic field generated by the magnet 24 and detected by the magnetic sensor 28, in particular a flux density detected by the magnetic sensor 28, and thus in particular a switching value of a second switching signal generated by the magnetic sensor 28, namely the switching signal for the axial displacement, in particular a switching value of the switching signal representative for a relative movement between magnet 24 and magnetic sensor 28 in a second direction of movement or for a second actuating direction R2 of the magnet 24, the magnetic sensor 28 being designed to generate a switching signal as a function of an axial displacement of the magnet 24 relative to the magnetic sensor 28 along or parallel to the second axis A2.

This switching signal can also be transmitted to the evaluation device and evaluated by it. The position of the actuating element 22 can thus also be determined with the magnet 24 and the magnetic sensor 28. That is to say no additional magnet or an additional magnetic sensor are required for this. This allows a particularly installation space-saving and cost-effective steering column switch to be realized.

In a functional installation state in a vehicle, a corresponding device connected to the evaluation device can then further be controlled with the aid of a control signal sent by the evaluation device as a function of the actuating position of the actuating element 22.

In order to establish the rotationally fixed connection to the first actuating element 21, that is to say the rotary ring 21, which can be rotated about the first axis A1 or the second axis A2 by a total rotation angle of about 90°, the magnet 24 is fixedly connected to a projection 25, which serves as a driver 25, extending in the radial direction, with respect to the first axis A1 or the second axis A2, and engages in a rail-shaped groove (cf. FIG. 3) which is formed in a U shape in the rotary ring 21 in the radial direction and extends in the axial direction, that is to say parallel to the first axis A1 or to the second axis A2.

In connection with the rotatable mounting of the magnet 24 about the first axis A1 in the second actuating element 22, in particular in its slide 29, this can result in the fact that a rotational movement of the first actuating element 21 in the form of the rotary ring 21 about the first axis A1 leads to a rotation of the magnet 24, but without the second actuating element 22 rotating at the same time and without causing an axial displacement of the second actuating element 22 with the magnet 24 axially fixed thereon.

In addition, an actuating movement of the second actuating element 22 in the second actuating direction R2, in particular an axial displacement of the actuating element 22 to the right (with respect to the illustration in FIG. 1), can bring about an axial displacement of the magnet 24 relative to the magnetic sensor 28 without the first actuating element 21 (the rotary ring 21) being displaced at the same time and without a rotation of the magnet 24 being brought about.

Furthermore, in this exemplary embodiment of a steering column switch 20 according to the invention, the magnetic sensor 28 is also designed to generate a third switching signal as a function of a relative movement of the magnetic sensor 28 along a third axis A3, in particular parallel to a third actuating direction R3 relative to the magnet 24.

In this steering column switch 20, the axial displacement of the magnetic sensor 28 along the third axis A3, which in this case extends perpendicular to the first axis A1 and to the second axis A2, relative to the magnet 24 can be brought about by pressing the third actuating element 23 in the third actuating direction R3, in particular in the radial direction, the actuating element 23 acting directly on the printed circuit board 27 and displacing it axially parallel to the third actuating direction R3 and thus the magnetic sensor 28 fastened to the printed circuit board 27.

In order to enable the actuating elements to be reset in a simple manner, in particular the axially displaceable actuating elements 22 and 23, in each case rubber pads, in particular rubber mats 26A and 26B, are provided which act like a resetting spring and are each elastically deformed when the associated actuating element 22 or 23 is actuated and thus store a corresponding resetting energy, which after a release, in particular a letting go or disengagement, of the actuating element 22 or 23 effect a corresponding reset. The resetting elements 26A and 26B, in particular the rubber pads 26A and 26B, of the second and third actuating elements 22 and 23 are preferably of identical design. As a result, the number of variants of components to be kept available can be reduced, which usually has an advantageous effect on costs.

In order to reset the actuating element 21 which can be actuated by a rotational movement, in particular the rotary ring 21, a torsion spring (not shown here) can in particular be realized.

For an advantageous force distribution, in each case two symmetrically arranged ones of these rubber pads 26A and 26B are preferably provided for resetting the actuating element 22 and for resetting the actuating element 23.

On the basis of FIG. 3, which shows a section along the section plane A-A' through part of the components from FIG. 1 in a first sectional view, it is particularly clearly visible how the driver 25, which is rotationally fixedly connected to the magnet 24, engages in the rail-shaped groove 31 of the actuating element 21 and how the magnet 24 is rotatably mounted in the slide 29 of the actuating element 22 about the first axis A1, in particular is received in a recess of this, with FIG. 3 showing the actuating element 21 approximately at a central angle of rotation, that is to say during a relative rotation starting from a zero position of approximately 45° with a total angle of rotation of approximately 90°.

Owing to the specific design of the magnet 24 as a cylinder with half polarity N, S with the separating plane T in the longitudinal direction and with the end face in the direction of the magnetic sensor 28, the flux density detected by the magnetic sensor 28 changes as a function of the angle of rotation. This enables the detection of a plurality of switching positions over the entire angle of rotation of a total of 90°, this steering column switch 20 according to the invention, in particular the evaluation device, being set up to detect eight switching positions of the operating element 21 and thus eight switching states of the steering column switch for the first actuating direction R1.

Figure 4:
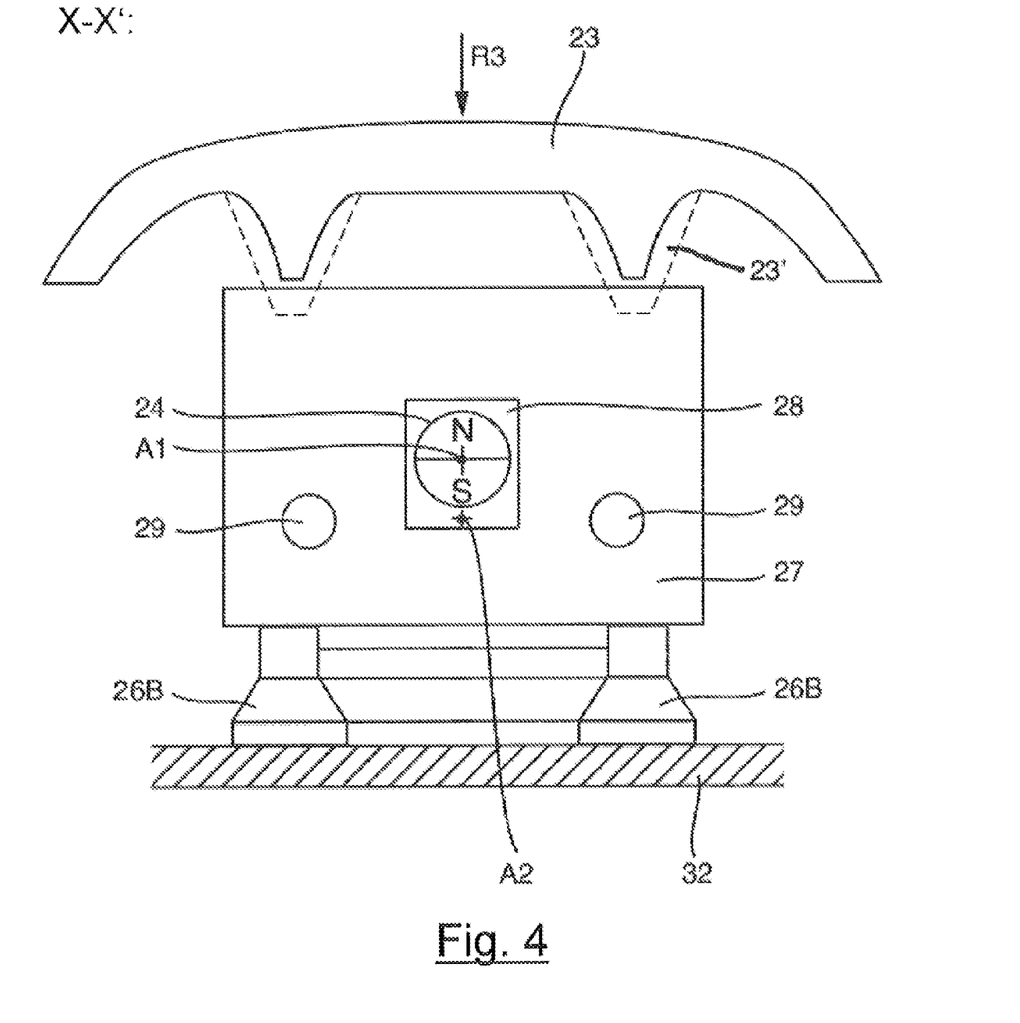
FIG. 4 shows a section along the section plane A-A' through part of the components from FIG. 1 in a second sectional view.

FIG. 4 shows the sectional view of the other section surface of the section along the section plane A-A' according to FIG. 2, in which illustration it is particularly clear to see how the third actuating element 23 acts on, in particular is coupled to, the printed circuit board 27 with the magnetic sensor 28 fastened thereto, wherein the dashed lines are intended to indicate the actuating element 23 in a depressed, i.e. actuated, state (23').

The rubber mats 26B for resetting the printed circuit board 27 and thus the actuating element 23 can also be clearly seen by way of FIG. 4, the rubber pads 26B for resetting the printed circuit board 27 and the actuating element 23 being supported on the housing 32 of the steering column switch 20.

The steering column switch 20 also has in each case latching devices (not shown here) for releasably latching and locking the actuating elements 21, 22 and 23 in at least one actuating position, in particular in at least one switching position. As a result, the operating comfort of the steering column switch 20 can be improved.

In addition, a steering column switch 20 according to the invention can also have at least one mechanically actuatable press switch, in particular a press switch with a mechanically actuatable electrical switching contact, electrical contact being able to be established by a mechanical actuating movement of the press switch. In this way, for example, a further operating function can be integrated into the steering column switch in a simple manner or a signal plausibility check can be made possible.

LIST OF REFERENCE DESIGNATIONS 1 steering column lever known from the prior art with a steering column switch known from the prior art 2 axially actuatable operating element
3 operating element which can be actuated by rotation
4 housing
5 actuating element coupled to the axially actuatable operating element 7
6 actuating element coupled to the axially actuatable operating element 2
7 axially actuatable operating element
8 magnet connected to the actuating element 6
9 magnet connected to the actuating element 5
10 printed circuit board
11 magnetic sensor for detecting the magnetic field generated by the magnet 9
12 magnetic sensor for detecting the magnetic field generated by the magnet 8
13 actuating element (rotary ring) coupled to the operating element 3 which can be actuated by rotation
14 magnet connected to the actuating element 13
15 magnetic sensor for detecting the magnetic field generated by the magnet 14
20 exemplary embodiment of a steering column switch according to the invention
21 first actuating element (rotary ring) which can be actuated by rotation
22 second, axially displaceable actuating element
23 third, axially displaceable actuating element
24 magnet
25 driver
26A, 26B rubber mat (resetting spring)
27 printed circuit board
28 magnetic sensor (3D Hall sensor)
29 slide
30 actuating surface
31 groove
32 housing
A axis
A-A' section plane
A1 first axis
A2 second axis
A3 third axis
N north pole
R1 first actuating direction
R2 second actuating direction
R3 third actuating direction
S south pole
T separating plane

The invention claimed is:

1. A steering column switch for a utility vehicle, wherein the steering column switch comprises:
a housing;
an actuating device which is coupled to an operating element and has at least one actuating element;
a magnet for generating a magnetic field, and
a magnetic sensor for detecting the magnetic field generated by the magnet,
wherein the at least one actuating element is at least partially movably mounted with respect to the housing and an actuating movement of the actuating element brings about a relative movement between the magnet and the magnetic sensor;
wherein the magnetic sensor is set up to detect the relative movement between the magnet and the magnetic sensor or a relative position of the magnet and magnetic sensor to one another and, depending on the detected relative movement or the detected relative position, to generate a switching signal for determining an actuating position of the actuating element and thus a switching state of the steering column switch;

wherein the actuating movement of the actuating element of the actuating device in a first actuating direction brings about a relative movement between the magnet and the magnetic sensor in a first direction of movement and the actuating movement of the actuating element of the actuating device in a second actuating direction brings about a relative movement between the magnet and the magnetic sensor in a second direction of movement different from the first direction of movement;

wherein the magnetic sensor is set up to detect the relative movement between the magnet and the magnetic sensor or a relative position of the magnet and magnetic sensor to one another in each case in the first direction of movement and in the second direction of movement and, depending on the detected relative movement or the detected relative position in the first direction of movement, to generate a first switching signal and, depending on the detected relative movement or the detected relative position in the second direction of movement, a second switching signal;

wherein a first actuating element is configured to rotate the magnet relative to the magnetic sensor about a first axis, and wherein a second actuating element is configured to axially displace the magnet relative to the magnetic sensor along a second axis.

2. The steering column switch as claimed in claim 1, wherein the steering column switch has at least two actuating elements, wherein the magnet is coupled to the first actuating element in a rotationally fixed manner and is rotatably mounted with respect to the second actuating element, wherein the magnet is axially displaceably mounted relative to the first actuating element, but is fixedly coupled to the second actuating element in the axial direction of movement.

3. The steering column switch as claimed in claim 1, wherein a third actuating element, is axially displaced by an axial displacement of the third actuating element along or parallel to a third axis, an axial displacement of the magnet or the magnetic sensor along or parallel to the third axis is brought about.

4. The steering column switch as claimed in claim 1, wherein the magnetic sensor has a 2D or 3D Hall sensor or is the 2D or 3D Hall sensor.

5. The steering column switch as claimed in claim 3, wherein the magnetic sensor is arranged on a carrier plate and the relative movement between the magnet and the magnetic sensor in a third direction of movement can be brought about by an axial displacement of the carrier plate in a carrier plate plane.

6. The steering column switch as claimed in claim 1, wherein the magnet is a permanent magnet which has a shape of a straight prism with a circular base.

7. The steering column switch as claimed in claim 6, wherein the magnetic sensor is arranged on a carrier plate and the carrier plate extends at least partially in a carrier plate plane, wherein the magnet is arranged relative to the magnetic sensor so that its longitudinal axis extends perpendicular to the carrier plate plane.

8. The steering column switch as claimed in claim 6, wherein the magnet has a constant polarity along its longitudinal axis, wherein a separating plane between two magnetic poles is formed by a longitudinal center plane.

9. The steering column switch as claimed in claim 1, wherein the steering column switch has at least one elastically deformable resetting element comprising an elastic rubber mat or a resetting spring, for resetting the at least one actuating element.

10. The steering column switch as claimed in claim 1, wherein the steering column switch has at least one latching device for releasably latching or locking the at least one actuating element in at least one actuating position.

11. The steering column switch as claimed in claim 1, wherein the steering column switch furthermore has at least one mechanically actuatable press switch with a mechanically actuatable electrical switching contact, wherein an electrical contact is brought about by a mechanical actuating movement of the press switch.

12. A steering column lever with the steering column switch, wherein the steering column switch is configured as claimed in claim 1.

13. A vehicle with the steering column lever, wherein the steering column lever is configured as claimed in claim 12.

* * * * *